U S012420612B2

United States Patent
Plinninger et al.

(10) Patent No.: US 12,420,612 B2
(45) Date of Patent: Sep. 23, 2025

(54) AIR-CONDITIONING DEVICE FOR USE IN A VEHICLE FOR PASSENGER TRANSPORT

(71) Applicants: Siemens Mobility GmbH, Munich (DE); Siemens Mobility Austria GmbH, Vienna (AT)

(72) Inventors: Thomas Plinninger, Rosenheim (DE); Christian Schelander-Klopsch, Vienna (AT)

(73) Assignees: Siemens Mobility Austria GmbH, Vienna (AT); Siemens Mobility GmbH, Munich (DE)

( * ) Notice: Subject to any disclaimer, the term of this patent is extended or adjusted under 35 U.S.C. 154(b) by 0 days.

(21) Appl. No.: 18/845,968

(22) PCT Filed: Feb. 17, 2023

(86) PCT No.: PCT/EP2023/054019
§ 371 (c)(1),
(2) Date: Sep. 11, 2024

(87) PCT Pub. No.: WO2023/169801
PCT Pub. Date: Sep. 14, 2023

(65) Prior Publication Data
US 2025/0108675 A1 Apr. 3, 2025

(30) Foreign Application Priority Data
Mar. 11, 2022 (DE) ...................... 10 2022 202 473.7

(51) Int. Cl.
*B60H 1/00* (2006.01)
*B60H 3/06* (2006.01)

(52) U.S. Cl.
CPC ....... *B60H 1/00514* (2013.01); *B60H 3/0608* (2013.01)

(58) Field of Classification Search
CPC ...... F24F 1/022; F24F 1/0047; B60H 3/0608; B60H 1/00514
(Continued)

(56) References Cited

U.S. PATENT DOCUMENTS 5,176,205 A * 1/1993 Anthony ............... B23K 35/286
228/183
2020/0096248 A1 * 3/2020 Mills ....................... F25B 49/02
(Continued)

FOREIGN PATENT DOCUMENTS

| CN | 112572109 A | 3/2021 |
|---|---|---|
| DE | 8226125 U1 | 5/1983 |
| EP | 1736333 A2 | 12/2006 |

*Primary Examiner* — Vivek K Shirsat
(74) *Attorney, Agent, or Firm* — Laurence A. Greenberg; Werner H. Stemer; Ralph E. Locher

(57) ABSTRACT

An air-conditioning device for use in a vehicle for passenger transport has an outer housing for accommodating components of the air-conditioning device. A supply fan in the form of a radial fan conveys conditioned supply air in the direction of a passenger compartment of the vehicle. Air that is taken in by the supply fan is deflected outwards, in relation to an axis of rotation of the impeller of the supply fan, in such a way that the air impinges on inner surface regions, associated with the supply fan, of an enclosing apparatus radially surrounding the supply fan. The inner surface regions of the enclosing apparatus are provided with adsorption structures which are designed to separate droplets/aerosols out of the deflected air.

11 Claims, 3 Drawing Sheets

(58) Field of Classification Search
USPC .......................................... 454/136–138, 158
See application file for complete search history.

(56) References Cited

U.S. PATENT DOCUMENTS

2021/0063026 A1\* 3/2021 Kim ........................ F24F 13/28
2021/0331551 A1  10/2021 Kato et al.

\* cited by examiner

AIR-CONDITIONING DEVICE FOR USE IN A VEHICLE FOR PASSENGER TRANSPORT

FIELD AND BACKGROUND OF THE INVENTION

The invention relates to an air-conditioning device for use in a vehicle for passenger transport, with an outer housing for accommodating components of the air-conditioning device that comprises a supply fan configured as a radial fan for conveying conditioned supply air toward a passenger compartment of a vehicle.

Such air-conditioning devices are often used in vehicles for passenger transport, such as rail vehicles or buses.

Their task is to condition the supply air intended for the passenger compartment in such a way that in particular relevant quality standards for passenger transport vehicles are met.

The conditioned supply air that is conveyed toward the passenger compartment is typically composed of drawn-in fresh air and recirculated air from the passenger compartment. The recirculated air in particular may contain droplets and/or aerosols contaminated with viruses or other pathogens such as bacteria or microorganisms.

In order to reduce, for example, the viral load in the supply air for a passenger compartment of a vehicle, it is as known to use highly effective filters (e.g., HEPA filters) in the supply air path to separate aerosols and/or droplets. However, this is not expedient, as installation of the filter is accompanied by a considerable pressure loss, such that the energy consumption for conveying the supply air and the noise level in the system increase significantly. In addition, these filters require regular cleaning or need to be changed at intervals.

Further measures for reducing the viral load of air, such as UV lamps, high-voltage electrostatic filters etc. are technically difficult to implement and vary greatly in effectiveness. They moreover have a very negative impact on energy consumption and space requirements, among other things.

It is also conceivable to increase the proportion of fresh air at the expense of the proportion of recirculated air in the supply air which, as described above, is a mixture of recirculated and fresh air. However, this has the disadvantage that firstly the increased volume of fresh air does not reduce the number of viruses within the air-conditioning device, as all the virus particles from the recirculated air are also transported into the air mixture. In addition, increasing the proportion of fresh air in the supply air has the disadvantage of increasing the energy consumption of the air-conditioning device, wherein, in particular in winter, the humidity of the interior air can be reduced under certain circumstances, which can have a detrimental effect on the propagation of viruses in the passenger compartment.

SUMMARY OF THE INVENTION

Against this background, the object of the invention is to further develop an air-conditioning device of the above-stated type in such a way that the pathogen contamination of the supply air provided by the air conditioning device is reduced.

This object is achieved in the air-conditioning device of the above-stated type in that the supply fan deflects drawn-in air outward relative to an axis of rotation of an impeller of the supply fan in such a way that the air impinges on inner surface regions, associated with the supply fan, of an enclosing apparatus radially surrounding the supply fan and these inner surface regions of the enclosing apparatus are equipped with adsorption structures that are configured to separate droplets/aerosols (T) from the deflected air.

The provided adsorption structures are thus located in the flow path of the supply air which has immediately left the supply fan. The adsorption structures make it possible to separate any virus-containing droplets/aerosols from the supply air stream such that they are removed from the supply air. In this way, any potential viral load in the supply air originating from contamination of the recirculated air drawn in from the passenger compartment toward the air-conditioning device can be effectively reduced.

The enclosing apparatus can preferably be connected to an air duct portion arranged between the supply fan and an outlet opening of the outer housing. This variant in particular makes sense if the air-conditioning device has an internal air duct.

It is alternatively also possible for the enclosing apparatus to be integrated in the outer housing of the air-conditioning device. This variant is suitable for air-conditioning device types without an internal air duct.

The axis of rotation of the impeller of the supply fan is preferably arranged in a longitudinal direction of the air-conditioning device. The longitudinal direction of the air-conditioning device corresponds to a main direction of flow for the air to be conveyed. Alternatively, the supply fan can also be arranged "horizontally" in the air-conditioning device, which may optionally require further flow guidance elements within the air-conditioning device in order to introduce the conditioned supply air into an air-conditioning duct system leading to the passenger compartment. The spatial arrangement of the enclosing apparatus equipped with the adsorption structures is always linked to the positioning of the supply fan.

In one embodiment, the adsorption structures can be formed by a metal mesh. Such a structure is well suited to having droplets or aerosols separated onto it.

In another embodiment, the adsorption structures are advantageously configured as ribs. These are preferably oriented transversely of the axis of rotation of the fan. These ribs form obstacles for the supply air immediately as it leaves the supply fan and are suited to separating droplets and aerosols. The ribs can differ from one another in their dimensions (length, height, width and spacing from one another) so as to create a variable "obstacle structure", which is adapted to the particular volumetric flow rate and particular size distribution of the droplets or aerosols, for the droplets and/or aerosols present in the supply air.

The adsorption structures can preferably be arranged between the inner surface regions of the enclosing apparatus and a perforated plate forming an inner housing.

A heating apparatus for the adsorption structures is preferably provided. This heating apparatus is advantageously designed such that viruses or other pathogens present in the droplets and/or aerosols are effectively killed. If it is assumed by way of example that the air in the passenger compartment is contaminated with SARS-COV-2 viruses, a heating apparatus that is to be used will be designed such that it is suitable for heating the adsorption structures to a temperature of at least 80° C.

The adsorption structures can for example be heated directly via the enclosing apparatus. This can be achieved, for example, by way of a heating foil that is arranged on outer surface regions associated with the inner surface regions of the enclosing apparatus. It is, however, likewise conceivable for the adsorption structures, in particular if they are formed by a metal mesh, to comprise integrated heating coils.

The enclosing apparatus may have a U-shaped cross-section throughout and the adsorption structures can then be arranged in the interior of the enclosing apparatus. In this embodiment, the open sides of the enclosing apparatus can face toward the supply fan and be covered by way of a perforated plate. The advantage in this case is that the adsorption structures do not protrude into an air duct in which the supply fan is arranged. In this respect, the general air flow toward the supply fan and away from the supply fan toward the passenger compartment remains largely unaffected. In the variant with the metal mesh, the perforated plate can be used for securing the metal mesh. In all embodiments, this improves the acoustic characteristics of the air-conditioning device since air turbulence in the region of the enclosing apparatus is reduced.

Exemplary embodiments of the invention are explained in greater detail below with reference to the drawings, in which:

DETAILED DESCRIPTION OF THE INVENTION

Figure 1:
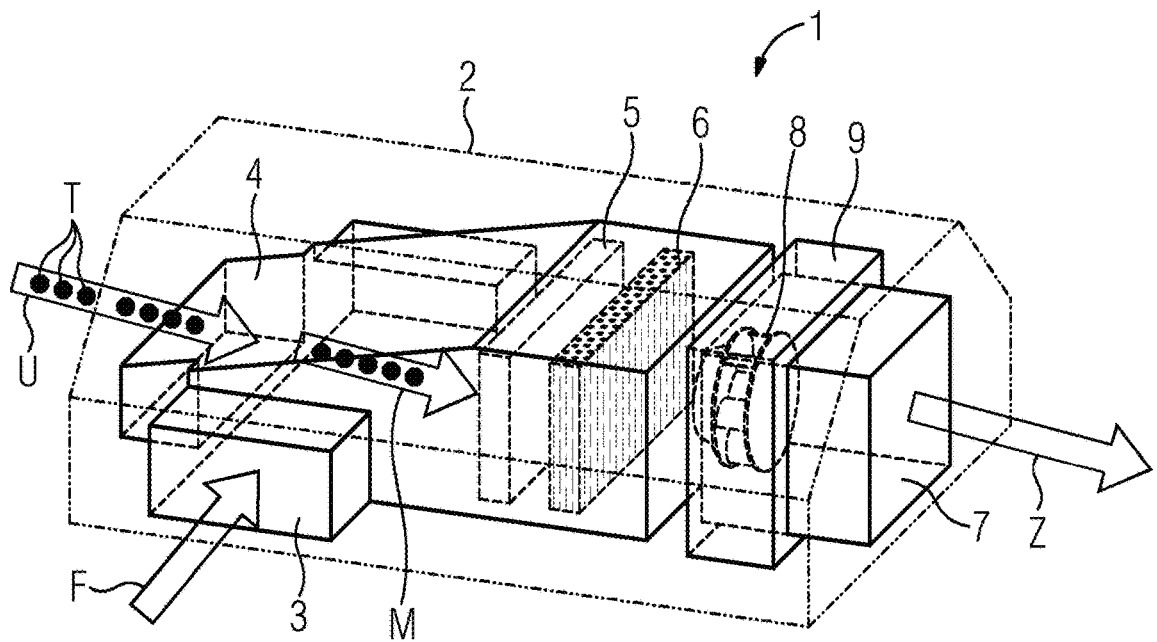
FIG. 1 is a schematic perspective view of an air-conditioning device for use in a vehicle for passenger transport.

FIG. 1 shows the general structure of an air-conditioning device 1 that is designed for use in a vehicle for passenger transport. This air-conditioning device 1 is typically mounted on a roof of the vehicle, for example of a rail vehicle or a bus, and is in fluidic connection to a passenger compartment of the vehicle via an air-conditioning duct arrangement (not shown). The air-conditioning device 1 comprises an outer housing 2 that an inlet opening 3 for fresh air F from the surroundings of the vehicle and an inlet opening 4 for recirculated air U supplied to the air-conditioning device 1 from the passenger compartment. The recirculated air U and the fresh air F are combined in suitable proportions in the air-conditioning device 1, such that an air mixture M including proportions of recirculated air and fresh air is obtained that is conditioned, for example with regard to temperature and humidity, in the air-conditioning device 1. To this end, the air mixture M passes firstly to an evaporator 5 of refrigeration circuit and then to a heating register 6. With the assistance of the evaporator 5 and the heating register 6, the air mixture M is conditioned such that it can be introduced into the passenger compartment as supply air Z via an outlet opening 7. A supply fan 8 is arranged in the air-conditioning device 1 downstream (suction arrangement) of the evaporator 5 and the heating register 6 and conveys the conditioned supply air Z through the outlet opening 7 toward the passenger compartment, cf. FIG. 2. Alternatively, the supply fan 8 could also be arranged upstream of the evaporator 5 and the heating register 6 (blowing arrangement).

Furthermore, an enclosing apparatus 9, which has a U-shaped cross-section throughout and completely radially surrounds the supply fan 8, is provided in the interior of the air-conditioning device 1. As explained with reference to FIGS. 3 to 6, adsorption structures for separating droplets and/or aerosols are arranged in the interior of the enclosing apparatus 9. An open side of the U-shaped cross-section of the enclosing apparatus 9 faces toward the supply fan 8.

Figure 3:
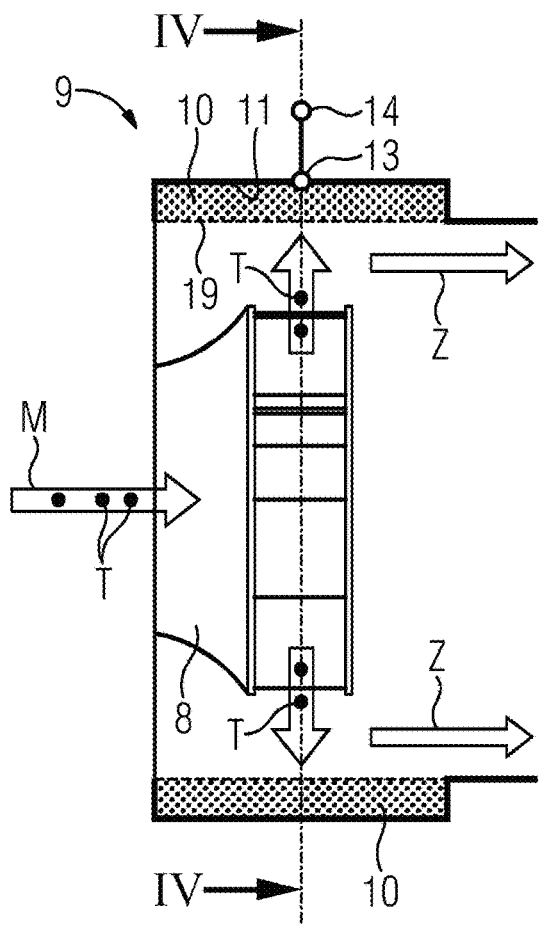
FIG. 3 is a schematic longitudinal sectional view through a region comprising a supply fan of the air-conditioning device of FIG. 1, in a first embodiment.

As is apparent from FIG. 3, a metal mesh 10 forming the adsorption structures is arranged in the surrounding enclosing apparatus 9. The metal mesh 10 is arranged in the region of such inner surface regions 11 of the outer housing 2, onto which regions the air deflected by an impeller 12 of the supply fan 8 impinges. The extent of the inner surface regions 11 in the direction of flow corresponds to at least twice the extent of the impeller 12 in the same direction. The impeller 12 is arranged centrally in the direction of flow between the surrounding inner surface regions 11.

It is apparent that the supply fan 8 deflects inflowing air mixture M outward, relative to an axis of rotation of the impeller 12 of the supply fan 8, specifically toward the metal mesh 10.

Figure 4:
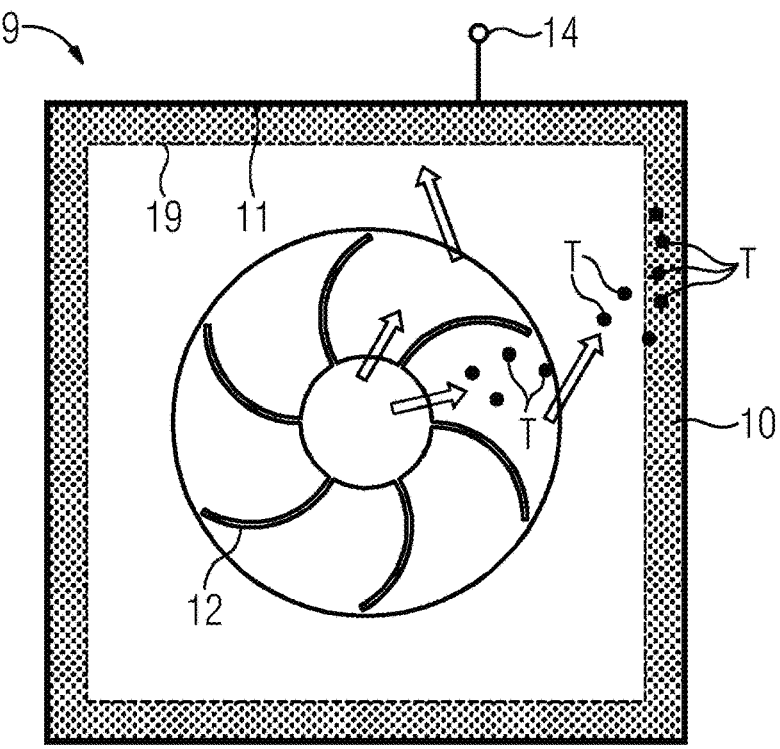
FIG. 4 is a schematic cross-sectional view along line IV-IV of FIG. 3.

This is also illustrated in FIG. 4. It is apparent that droplets or aerosols T present in the air mixture M are moved toward the metal mesh 10, specifically by the rotational motion of an impeller 12 of the supply fan 8.

Droplets and/or aerosols T contaminated with pathogens are deposited on the metal mesh 10.

For reasons of clarity, only some of the droplets/aerosols T are provided with reference signs.

Figure 2:
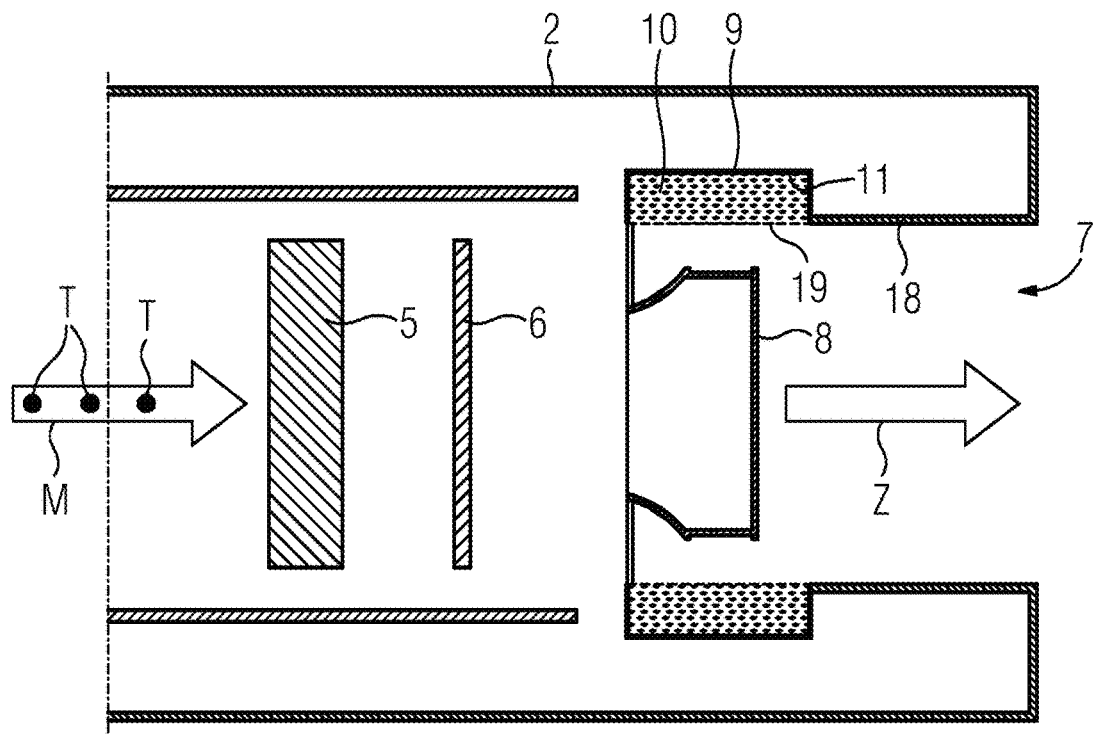
FIG. 2 is a schematic longitudinal sectional view of a portion of the air-conditioning device of FIG. 1.

In order to kill the pathogens deposited in the metal mesh 10, one or more heating coils 13 are integrated in the metal mesh 10, which is for example formed of steel wool, only one exemplary heating coil 13 being shown in each of FIGS. 2 and 3 for reasons of clarity. The heating coil 13 is supplied with power via an electrical terminal 14 arranged outside the enclosing apparatus 9.

Another embodiment of the invention is shown with reference to FIGS. 5 and 6 which differs from that explained with reference to FIGS. 2 and 3 solely with regard to the nature of the adsorption structures arranged in the enclosing apparatus 9 and the way the heating apparatus for killing the pathogens, such as viruses, bacteria or microorganisms, are embodied.

Specifically, starting from the inner surface regions 11 of the outer housing 2 on which air deflected by the supply fan 8 impinges, metallic ribs 15 that differ in their dimensions and form obstacles for the air contaminated with pathogens are preferably arranged in the enclosing apparatus 9. For reasons of clarity, only some of the ribs 15 are likewise provided with reference signs. The ribs 15 are oriented transversely of the direction of airflow. The 8 ribs 15 form obstacles for droplets and/or aerosols T that are deflected by the supply fan 8 toward the inner surface regions 11.

It is apparent that the ribs 15 differ in their dimensions both in the transverse direction of the supply fan 8 and in the direction of flow of the air mixture M, such that different types of obstacles that promote separation of the droplets and/or aerosols T are formed.

Figure 5:
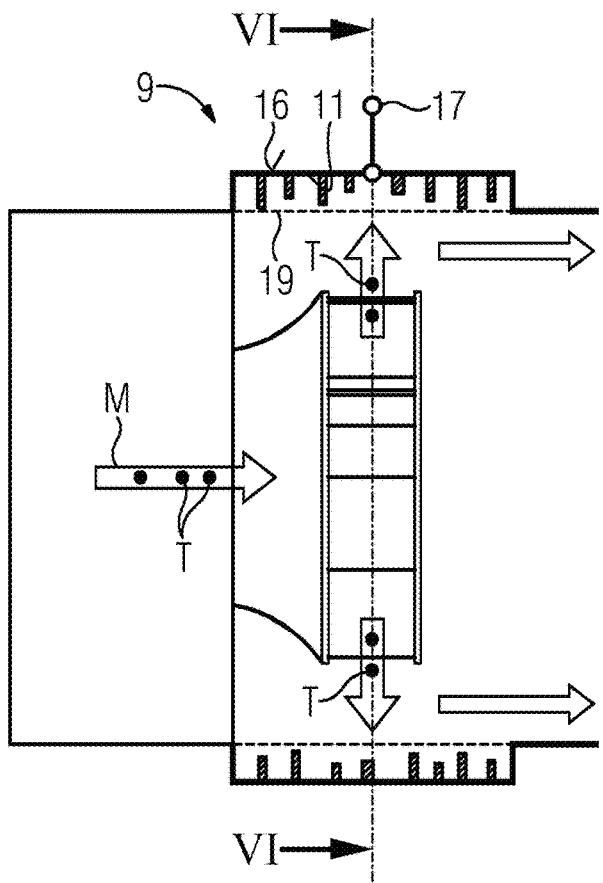
FIG. 5 is a schematic longitudinal sectional view through a region comprising a supply fan of the air-conditioning device of FIG. 1, in a second embodiment.
Figure 6:
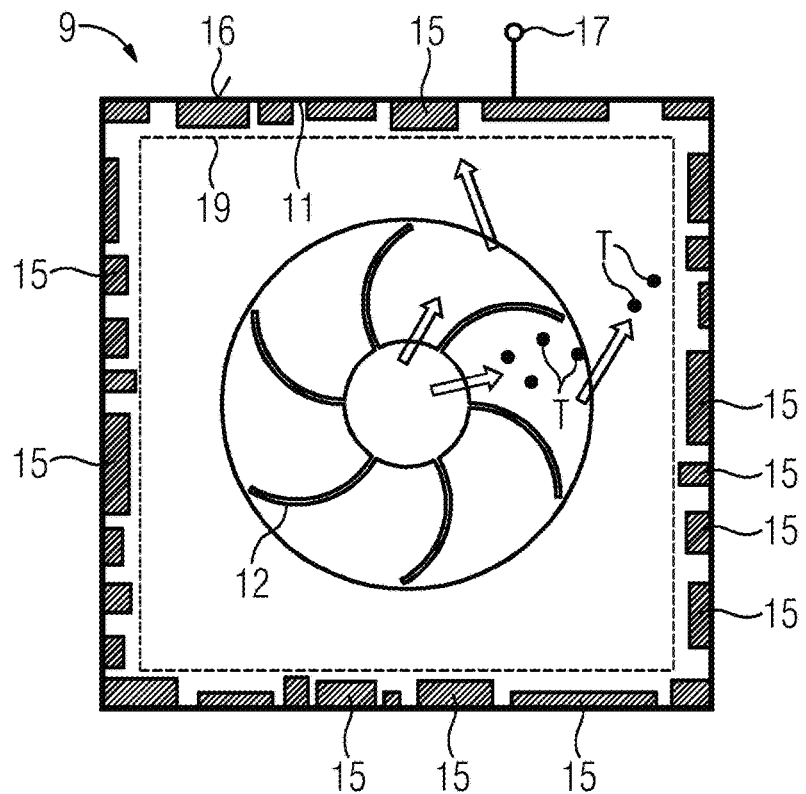
FIG. 6 is a schematic cross-sectional view along line VI-VI of FIG. 5.

In the embodiment according to FIGS. 5 and 6, the heating apparatus is configured as a thin heating foil 16 that is supplied with power via an electrical terminal 17. The heating foil 16 envelops the enclosing apparatus 9.

The heating foil 16 or a heating coil 13 integrated in the metal mesh 10 can be used to heat the metal mesh 10 and the surrounding surfaces to an elevated temperature at regular intervals (set-down, depot) in order to kill not only viruses but also bacteria/microorganisms. During heating operation of the air-conditioning device 1 in winter, this "heating function" can under certain circumstances even be operated permanently.

As far as regular cleaning of the adsorption structures is concerned, this region or the surrounding enclosing apparatus 9 around the supply fan 8 in air-conditioning devices is always accessible, such that simple cleaning of the region or, if necessary, for example replacement of the metal mesh 10 is possible.

An air duct portion 18 extends from the supply air outlet 7 toward the supply fan 8 and outwardly bounds an air stream prevailing in this region. The enclosing apparatus 9, which radially surrounds the supply fan 8, is connected to the air duct portion 18.

A feature common to the embodiments according to FIGS. 3 to 6 is that the adsorption structures in each case inserted into the interior of the enclosing apparatus 9, namely the metal mesh 11 or the ribs 15, are bounded in the direction of the supply fan 8. For this purpose, a perforated plate 19 is flush with the air duct portion 18. In this respect, the provided perforated plate 19 ensures that the airflow in the region of the supply fan 8 remains substantially unaffected by the provided adsorption structures, i.e., the adsorption structures bring about no appreciable additional flow resistance for the airflow or air turbulence in the region of the supply fan 8.

The invention claimed is:

1. An air-conditioning device for use in a vehicle for passenger transport, the device comprising:
- an outer housing for accommodating components of the air-conditioning device;
- said components including a supply fan for conveying conditioned supply air toward a passenger compartment of the vehicle;
- an enclosing apparatus disposed to radially surround said supply fan;
- said supply fan being a radial fan configured to deflect drawn-in air outward relative to an axis of rotation of an impeller of said supply fan to cause the air to impinge on inner surface regions of said enclosing apparatus associated with said supply fan; and
- adsorption structures disposed on said inner surface regions of said enclosing apparatus, said adsorption structures being ribs configured to separate droplets and aerosols from the deflected air, and said ribs having different dimensions from one another.

2. The air-conditioning device according to claim 1, wherein said enclosing apparatus is connected to an air duct portion that is arranged between said supply fan and an outlet opening of said enclosing apparatus.

3. The air-conditioning device according to claim 1, wherein said enclosing apparatus is integrated in said outer housing of the air-conditioning device.

4. The air-conditioning device according to claim 1, wherein the axis of rotation of the impeller of said supply fan is arranged in a longitudinal direction of the air-conditioning device.

5. The air-conditioning device according to claim 1, wherein said adsorption structures are formed by a metal mesh.

6. The air-conditioning device according to claim 1, wherein said ribs are oriented transversely to a direction of airflow through said outer housing.

7. The air-conditioning device according to claim 1, which further comprises a heating apparatus being a foil applied to outer surface regions associated with said inner surface regions of said enclosing apparatus.

8. The air-conditioning device according to claim 1, wherein said enclosing apparatus has a U-shaped cross-section throughout and said adsorption structures are arranged in an interior of said enclosing apparatus.

9. An air-conditioning device for use in a vehicle for passenger transport, the device comprising:
- an outer housing for accommodating components of the air-conditioning device;
- said components including a supply fan for conveying conditioned supply air toward a passenger compartment of the vehicle;
- an enclosing apparatus disposed to radially surround said supply fan;
- said supply fan being a radial fan configured to deflect drawn-in air outward relative to an axis of rotation of an impeller of said supply fan to cause the air to impinge on inner surface regions of said enclosing apparatus associated with said supply fan;
- adsorption structures disposed on said inner surface regions of said enclosing apparatus, said adsorption structures being configured to separate droplets and aerosols from the deflected air; and
- a heating apparatus for heating the adsorption structures, said heating apparatus being a foil applied to outer surface regions associated with said inner surface regions of said enclosing apparatus.

10. The air-conditioning device according to claim 9, wherein said heating apparatus is a heating coil integrated in said adsorption structures.

11. The air-conditioning device according to claim 8, which further comprises a perforated plate disposed to cover an open side of said U-shaped enclosing apparatus and facing toward said supply fan.

* * * * *